United States Patent [19]
Monoi

[11] Patent Number: 5,606,367
[45] Date of Patent: Feb. 25, 1997

[54] SOLID STATE IMAGING DEVICE HAVING COMMON OUTPUT COUPLING FOR MONITORING A PHOTOSENSITIVE PIXEL AND PICTURE PHOTOSENSITIVE PIXELS

[75] Inventor: Makoto Monoi, Tokyo, Japan

[73] Assignee: Kabushiki Kaisha Toshiba, Kanagawa-ken, Japan

[21] Appl. No.: 364,326

[22] Filed: Dec. 27, 1994

[30] Foreign Application Priority Data

Dec. 27, 1993 [JP] Japan .................. 5-331562

[51] Int. Cl.$^6$ .......................... H04N 5/232
[52] U.S. Cl. .................. 348/350; 348/324; 257/238; 257/239
[58] Field of Search .................. 348/294, 297, 348/298, 300, 311, 315, 316, 320–324, 229, 230, 222, 371, 375, 376, 362, 227, 350; 257/238, 239; 377/59, 61; H04N 5/235, 5/335

[56] References Cited

U.S. PATENT DOCUMENTS

| | | | |
|---|---|---|---|
| 4,471,228 | 9/1984 | Nishizawa et al. | 250/578 |
| 4,563,708 | 1/1986 | Ishibashi | 358/213 |
| 4,573,077 | 2/1986 | Imai | 358/212 |
| 4,635,126 | 1/1987 | Kinoshita | 358/228 |
| 4,701,626 | 10/1987 | Ishizaki et al. | 250/578 |
| 4,809,077 | 2/1989 | Norita et al. | 358/213.26 |
| 4,819,074 | 4/1989 | Suzuki | 358/209 |
| 4,843,474 | 6/1989 | Suzuki | 358/213.19 |
| 5,162,913 | 11/1992 | Chatenever et al. | 358/213.19 |
| 5,251,047 | 10/1993 | Kizu et al. | 358/471 |
| 5,267,015 | 11/1993 | Kai | 356/218 |

FOREIGN PATENT DOCUMENTS

| | | | |
|---|---|---|---|
| 41-80479 | 6/1992 | Japan | H04N 5/335 |
| 53-44418 | 12/1993 | Japan | H04N 5/243 |

*Primary Examiner*—Wendy Garber
*Assistant Examiner*—Ngoc-Yen Vu
*Attorney, Agent, or Firm*—Finnegan, Henderson, Farabow, Garrett & Dunner, L.L.P.

[57] ABSTRACT

A solid state imaging device includes a plurality of picture photosensitive pixels (pixel trains $P_1$–$P_n$) for generating signal charges corresponding to an incident light amount, a shift gate (12) and a charge coupled device (CCD) register (13) for sequentially transferring the signal charges outputted from the picture photosensitive pixels, and a monitor photosensitive pixel for generating signal charges in proportion to a mean value of the incident light amount of a predetermined number of the picture photosensitive pixels. The device further includes a single output circuit for converting both signal charges, one of which are generated in the picture photosensitive pixels and transferred through the shift, gate and CCD register, and the other of which are generated in the monitor photosensitive pixels, into an output signal, thereby providing the solid state imaging device capable of accurately measuring a mean value of the signal charges of the picture photosensitive pixels.

3 Claims, 15 Drawing Sheets

SOLID STATE IMAGING DEVICE HAVING COMMON OUTPUT COUPLING FOR MONITORING A PHOTOSENSITIVE PIXEL AND PICTURE PHOTOSENSITIVE PIXELS

BACKGROUND OF THE INVENTION

The present invention relates to a solid state imaging device including a photosensitive pixel for monitoring, and applicable to an automatic focusing device for a camera and the like.

A charge coupled device (CCD) image sensor has been well known as a solid state imaging device. There has been also well known a CCD image sensor including a photosensitive pixel for monitoring, which is applicable to the sensor used in an automatic focusing device of the camera and like, in order to control a storage time of a signal charge in each photosensitive pixel (for a picture) and a gain of an output circuit which converts the signal charge into an output signal.

FIG. 1 is a schematic view showing an example of a conventional CCD image sensor. In FIG. 1 a plurality of photosensitive pixels for a picture are arranged in a matrix shape on a semiconductor substrate (not shown) so as to form a plurality of pixel trains $P_1$ through $P_n$. A photosensitive pixel 1 for a monitor generates signal charges in proportion to a mean value of an incident light amount of the photosensitive pixels for a picture.

The signal charges generated in the photosensitive pixel 1 for a monitor are outputted as a signal $V_{AGC}$ through an output buffer 2 so as to supply to a control circuit (not shown) externally provided. The control circuit opens a shift gate S at each time when the supplied signal $V_{AGC}$ reaches a predetermined threshold value, so as to transfer the signal charges to a charge coupled device (CCD) register 4. Each of the signal charges transferred into the CCD register 4 are converted into an output signal in an output circuit 5 so as to be externally outputted. Here, the output circuit 5 comprises an output buffer 8, a voltage amplifying circuit 7, and a clamp circuit 8. The voltage amplifying circuit 7 changes over a gain according to an instruction from the control circuit when the signal $V_{AGC}$ is less than the threshold value, for example, because an incident light amount is little. Furthermore, the clamp circuit 8 causes the output signal of the output circuit 5 to be within an input range of an analog/digital (A/D) converter provided in the latter stage, in which the lower and upper most values are set by the control circuit.

In this manner, in the CCD image sensor as shown in FIG. 1, the monitor photosensitive pixel 1 is provided as means for measuring the mean value of the signal charges of each picture photosensitive pixel constituting the pixel trains $P_1-P_n$.

However, since the conventional CCD image sensor includes the output circuit 5 having the output signal of the output buffer 2 and the output signal $V_{AGC}$ which have different voltage gain and off-set voltage, the monitor photosensitive pixel 1 has a very bad accuracy as the measuring means for the mean value as described above.

Therefore, the CCD image sensor as shown in FIG. 1 also has the bad accuracy at the time when the threshold value is determined at opening the shift gate 3. Accordingly, such the CCD image sensor can not set the optimum threshold value corresponding to the incident light amount.

Furthermore, since the accuracy of the output signal $V_{AGC}$ is wrong, it is impossible to set the optimum values of the gain of the voltage amplifying circuit 7 and the upper and lower most values of the clamp circuit 8 by using the output signal $V_{AGC}$. Therefore, it has been on general to set the gain of the voltage amplifying circuit 7 and the upper and lower most values of the clamp circuit 8 to be the optimum value by using as a reference value the signal charges which are generated in a shaded pixel provided at the head of the pixel trains $P_1-P_n$ and which is a sinai pixel when the incident light amount is zero.

However, in the method of using the signal charges of such the shaded pixel, since the lowest level is used as the reference level without the means level, it is impossible to sufficiently and accurately set the gain of the voltage amplifying circuit 7 and the upper and lower most values of the clamp circuit 8. Such a fault becomes obvious according to the case where the contrast is small in the incident light amount of the pixel trains $P_1-P_n$.

SUMMARY OF THE INVENTION

In view of the above-mentioned fault of the prior art, an object of the present invention is to provide a solid state imaging device capable of accurately measuring a mean value of signal charges in each of photosensitive pixels for a picture.

In order to achieve the above object, the solid state imaging device according to the present invention includes a plurality of picture photosensitive pixels for generating first signal charges corresponding to an incident light amount, signal charge transfer means for transferring in order the first signal charges outputted from the picture photosensitive pixels, and a monitor photosensitive pixels for generating second signal charges in proportion to the means value of the incident light amount of the picture photosensitive pixels having a predetermined number, in which the solid state imaging device comprises output means for converting both of the first and second signal charges into first and second output signals, in which the first signal charges are generated in the picture photosensitive pixels and transferred by the signal charge transfer means, and the second signal charges are generated in the monitor photosensitive pixels.

As an aspect of the present invention, the solid state imaging device is desired to further comprise a clamp circuit which is provided in the output means for clamping the output signal which is generated by converting the first signal charges transferred from the signal charge transfer means, and a control circuit for setting an upper limit or low limit voltage of the clamp circuit on the basis of the output signal which is generated by converting the second signal charges of the monitor photosensitive pixels by the output means.

As a second aspect of the present invention, the solid state imaging device is desired to further comprise an amplifying circuit for amplifying the output signal which is converted from the first signal charges transferred from the signal charge transfer means, and a control circuit for setting a gain of the amplifying circuit on the basis of the output, signal which is converted from the second signal charges outputted from the monitor photosensitive pixels.

By the above construction, since the voltage gain and the off-set voltage of the first and second signal charges are caused to be equal to each other by the same output means which outputs the first signal charges generated in the picture photosensitive pixels and the second signal charges generated in the monitor photosensitive pixels, it is possible to accurately measure the means value of the first signal charges of the picture photosensitive pixels.

Furthermore, since it is possible to accurately measure the mean value of the first signal charges of the picture photosensitive pixels in the above way, the optimum value can accurately be set with respect to the gain of the voltage amplifying circuit and the upper limit and low limit values of the clamp circuit by using the mean value.

As described above, the solid state imaging device according to the present invention can accurately measure the mean value of the signal charges of the picture photosensitive pixels.

Accordingly, it is possible to precisely set the optimum value with respect to the gain of the voltage amplifying circuit and the upper limit and low limit values of the camp circuit both provided in the output circuit.

DETAILED DESCRIPTION OF THE PREFERRED EMBODIMENTS

There will be described in detail a solid state imaging device by using a CCD image sensor as an example according to preferred embodiments of the present invention in reference with the attached drawings.

Figure 2:
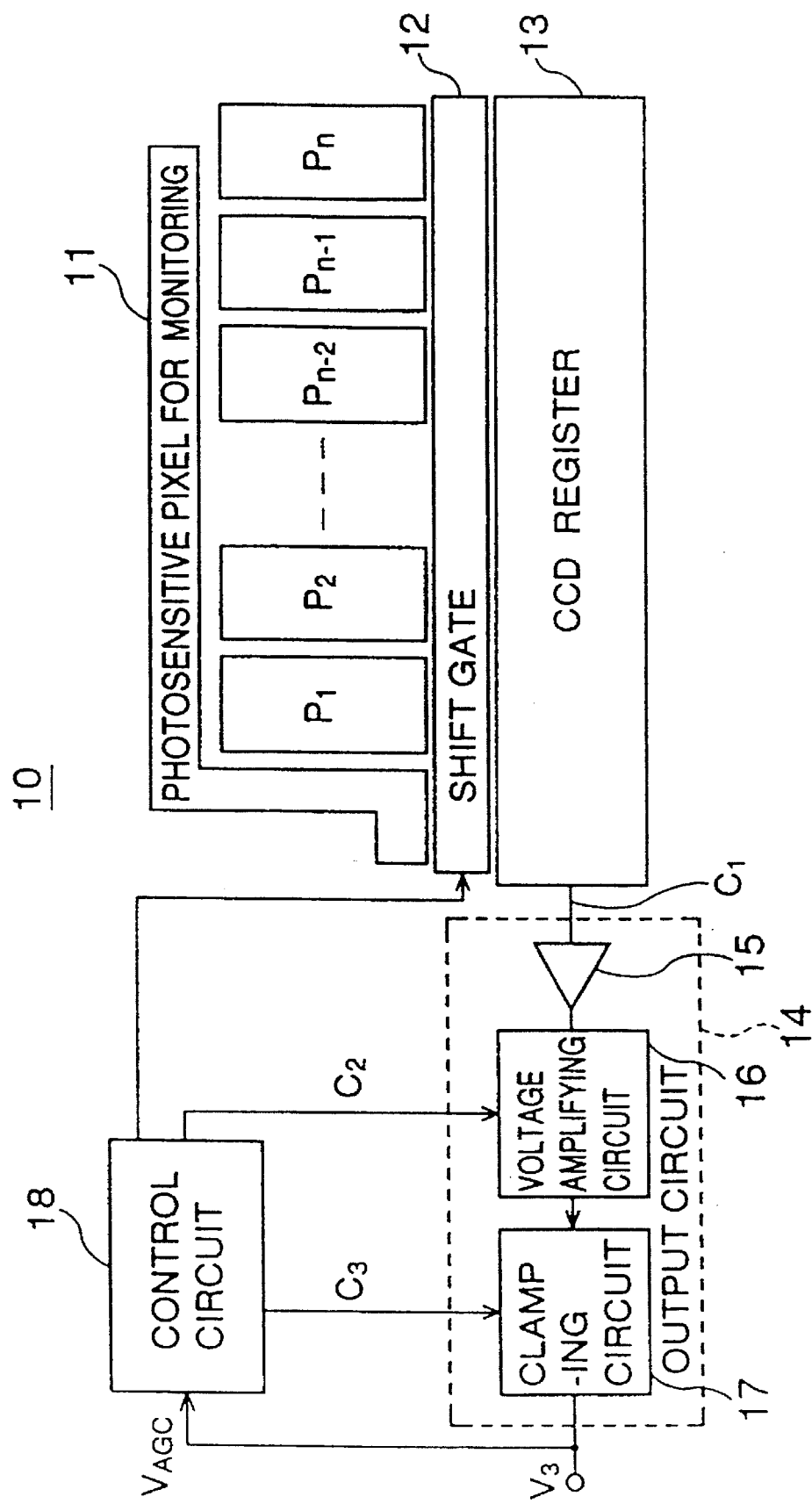
FIG. 2 is a block diagram schematically showing a constitution of a solid state imaging device according to a first embodiment of the present invention.

FIG. 2 shows a block diagram schematically showing a constitution of a CCD image sensor according to a first embodiment of the present invention.

In FIG. 2, a plurality of picture photosensitive pixels are arranged in a matrix shape on a semiconductor substrate (not shown), in which each line of the picture photosensitive pixels forms pixel trains $P_1-P_n$. Here, signal charges occurring in each picture photosensitive pixel can be transferred to the direction for a shift gate 12.

Monitor photosensitive pixel 11 is arranged along two sides of a region in which the pixel trains $P_1-P_n$ are arranged as shown in FIG. 2, so as to generate signal charges in proportion to a mean value of an incident light amount of these picture photosensitive pixels.

A shift gate 12 comprises a portion which transfers the signal charges from the pixel trains $P_1-P_n$ to the CCD register 13, and a portion which transfers the signal charges from the monitor photosensitive pixel 11. Opening and closing of the shift gate 12 are controlled by a control circuit 18 which will be mentioned later.

The CCD register 13 takes into the signal charges occurring in the pixel trains $P_1-P_n$ from the shift register 12 as a parallel signal so as to convert the parallel signal into a serial signal, thereby outputting the digital signal to an output circuit 14 which will be mentioned later. When the signal charges occurring in the monitor photosensitive pixel 11 are taken by the shift gate 12, the signal charges are transferred to the output circuit 14 as they are.

The output circuit 14 comprises an output buffer 15, a voltage amplifying circuit 16, and a clamping circuit 17, which are the same constitution as the conventional CCD image sensor.

A control circuit 18 takes in order an output signal $V_{AGC}$ which is obtained by converting in the output circuit 14 the signal charges occurring in the monitor photosensitive pixel 11. At each time when an integral value of the signal $V_{AGC}$ reaches to a predetermined threshold value, any gate of the shift gate 12 is opened for transferring the signal charges occurring in the corresponding pixel in the picture photosensitive pixels $P_1-P_n$ to the CCD register 13. Furthermore, the control circuit 18 changes over the gain in the voltage amplifying circuit 16 corresponding to a value of the signal $V_{AGC}$. Moreover, the circuit 18 changes over the upper limit or low limit value of the clamping circuit 17 corresponding to the value of the signal $V_{AGC}$.

Figure 3:
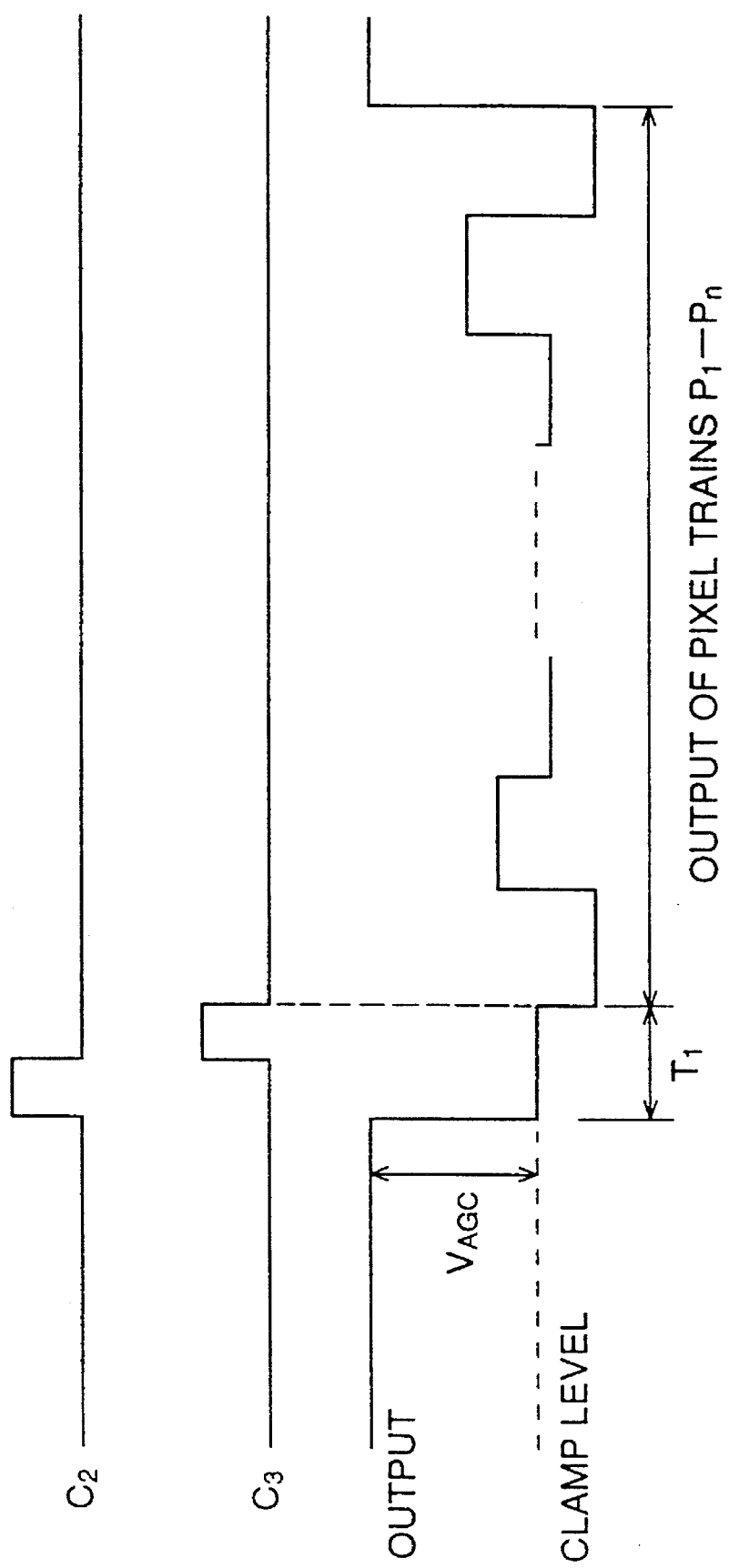
FIG. 3 is a graph showing a change with lapse of time in a output signal of an output circuit shown in FIG. 2.

Next, there will be described operation of the CCD image sensor shown in FIG. 2 in accordance with FIG. 3 which is a graph showing a change with lapse of time of a voltage level in an output signal of the output circuit 14.

First, the control circuit 18 opens a gate corresponding to the monitor photosensitive pixel 11 in the shift gate 12. By this, the signal charges occurring in the monitor photosensitive pixel 11 are transferred by the CCD register 13 into the output circuit 14 in which the signal charges are converted into the output signal $V_{AGC}$. The signal $V_{AGC}$ is supplied to the control circuit 18 in which the value of the signal $V_{AGC}$ accurately corresponds to the mean value of the signal charges of the picture photosensitive pixels constituting the pixel trains $P_1$–$P_n$.

The control circuit 18 uses the inputted signal $V_{AGC}$ and determines the threshold value for opening and closing the shift gate 12, the gain of the voltage amplifying circuit 16, and the upper limit and low limit values of the clamp in the clamping circuit 17 during a time $T_1$.

Here, the gain of the voltage amplifying circuit 16 is controlled by comparing the signal $V_{AGC}$ with a plurality of judge levels (represented here as $V_1, V_2, \ldots$) in order. For example, the gain may be set to the different values when $V_1 > V_{AGC} > V_2$, or when $V_2 > V_{AGC} > V_3$. In the first embodiment, since the signal $V_{AGC}$ is clamped by the clamping circuit 17, it is possible to easily set the judge levels from the upper or low limit value of a clamping.

Furthermore, the upper and low limit values of a clamp in the clamping circuit 17 are determined along the standard of the signal $V_{AGC}$. Accordingly, since the value of the signal $V_{AGC}$ precisely corresponds to the mean value of the signal charges of the picture photosensitive pixels as has been described, it is unnecessary to determine the upper and low limit values of the clamp by using as the standard the signal charges which are generated in the shaded pixels. Therefore, in the first embodiment, since it is easy to set the optimum value with respect to the upper and low limit values, a high quality picture signal can be obtained even though there is a case where a contrast is small with respect to each signal charge in the picture photosensitive pixels.

Furthermore, the threshold value for opening and closing the shift gate 12 is determined by an integral result of the signal $V_{AGC}$ supplied during the time $T_1$.

When the threshold value is determined, the control circuit 18 continuously inputs the signal $V_{AGC}$ and integrates the inputted signal $V_{AGC}$. When the integral result reaches to the threshold value, the circuit 18 closes the gate corresponding to the monitor photosensitive pixel 11 in the shift gate 12, and opens the gate corresponding to the picture photosensitive pixel trains $P_1$–$P_n$. By this, the signal charges occurring in the picture photosensitive pixels are transferred to the CCD register 13 in which the charges are converted from a parallel signal into a serial signal so as to sequentially input into the output circuit 14. These signal charges are converted into voltage signals by an output buffer 15, which are amplified in the voltage amplifying circuit 16. The clamping circuit clamps the amplified voltage signals so as to be outputted to an analog/digital converter (not shown) as the next stage.

In this manner, in the CCD image sensor according to the first embodiment, the single output circuit 14 converts the first signal charges occurring in the pixel trains $P_1$–$P_n$ and the second signal charges occurring in the monitor photosensitive pixel 11 into the output signal to be outputted. Accordingly, since the voltage gain and the off-set are the same in these signal charges, it is possible to improve the accuracy of the mean value of the signal charges of the picture photosensitive pixels measured by the monitor photosensitive pixel 11.

Therefore, it is possible for the first embodiment to precisely set the optimum value with respect to the gain of the voltage amplifying circuit 16 and the upper and low limit values of the clamping circuit 17.

Figure 1:
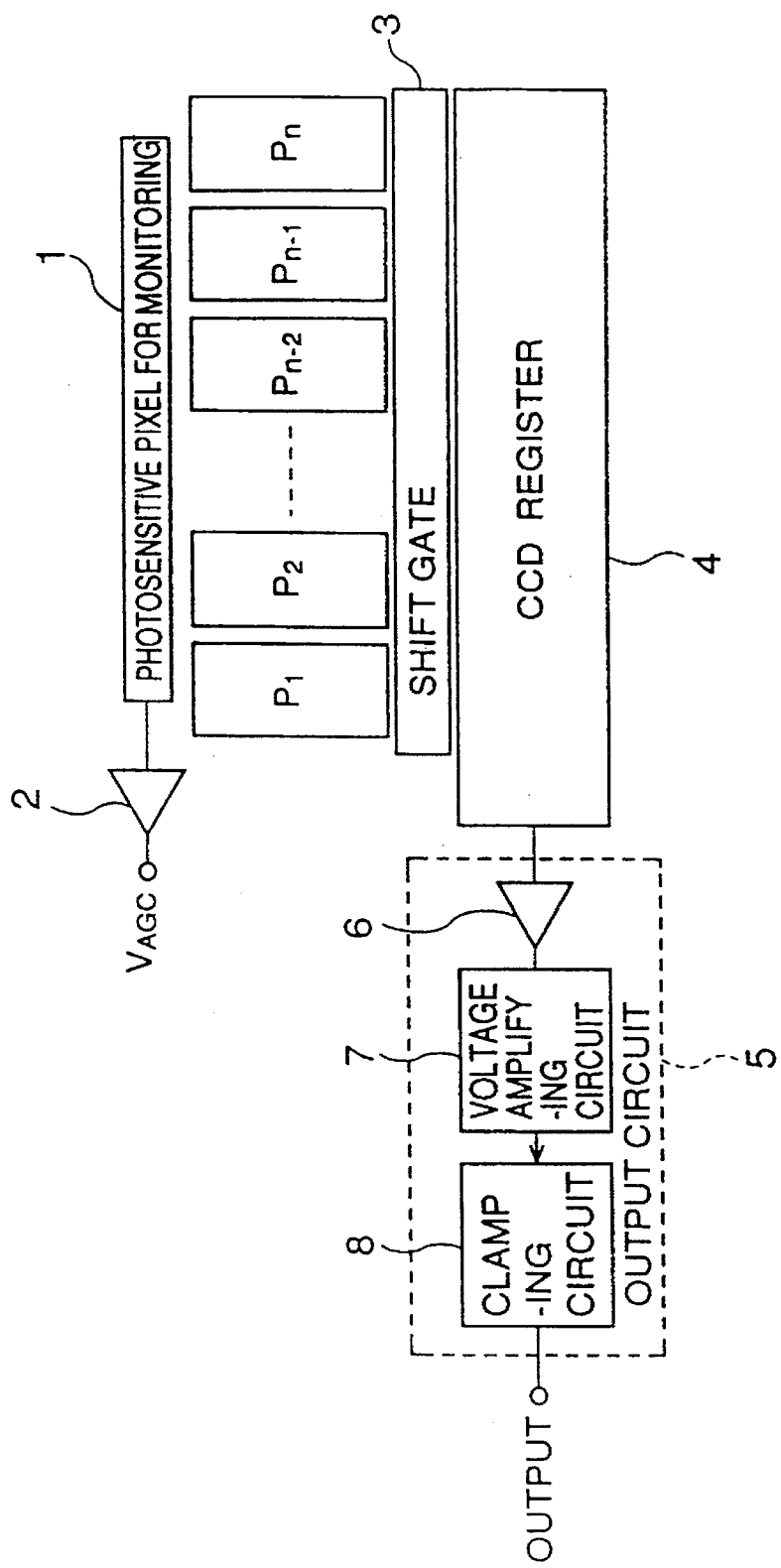
FIG. 1 is a block diagram schematically showing a constitution of the conventional solid state imaging device.

In the first embodiment, even though there has been described the monitor photosensitive pixel which is arranged alone two sides of the region in which the pixels $P_1$–$P_n$ are arranged, the present invention is not limited in such a configuration. For example, the monitor photosensitive pixel may be arranged along one side of the region in which the pixels $P_1$–$P_n$ are arranged in the same manner of the conventional CCD image sensor (see FIG. 1).

Furthermore, even though the first embodiment adopts the configuration in which the shift register 12 and the CCD register 13 transfer the signal charges occurring in the monitor photosensitive pixel 11 into the output circuit 14, the present invention may comprise other means fir transferring the signal charges into the output circuit 14.

Moreover, even though the first embodiment comprises only one monitor photosensitive pixel, another monitor photosensitive pixel and output buffer may be provided in addition to the pixel 11 and output buffer 15.

Figure 4:
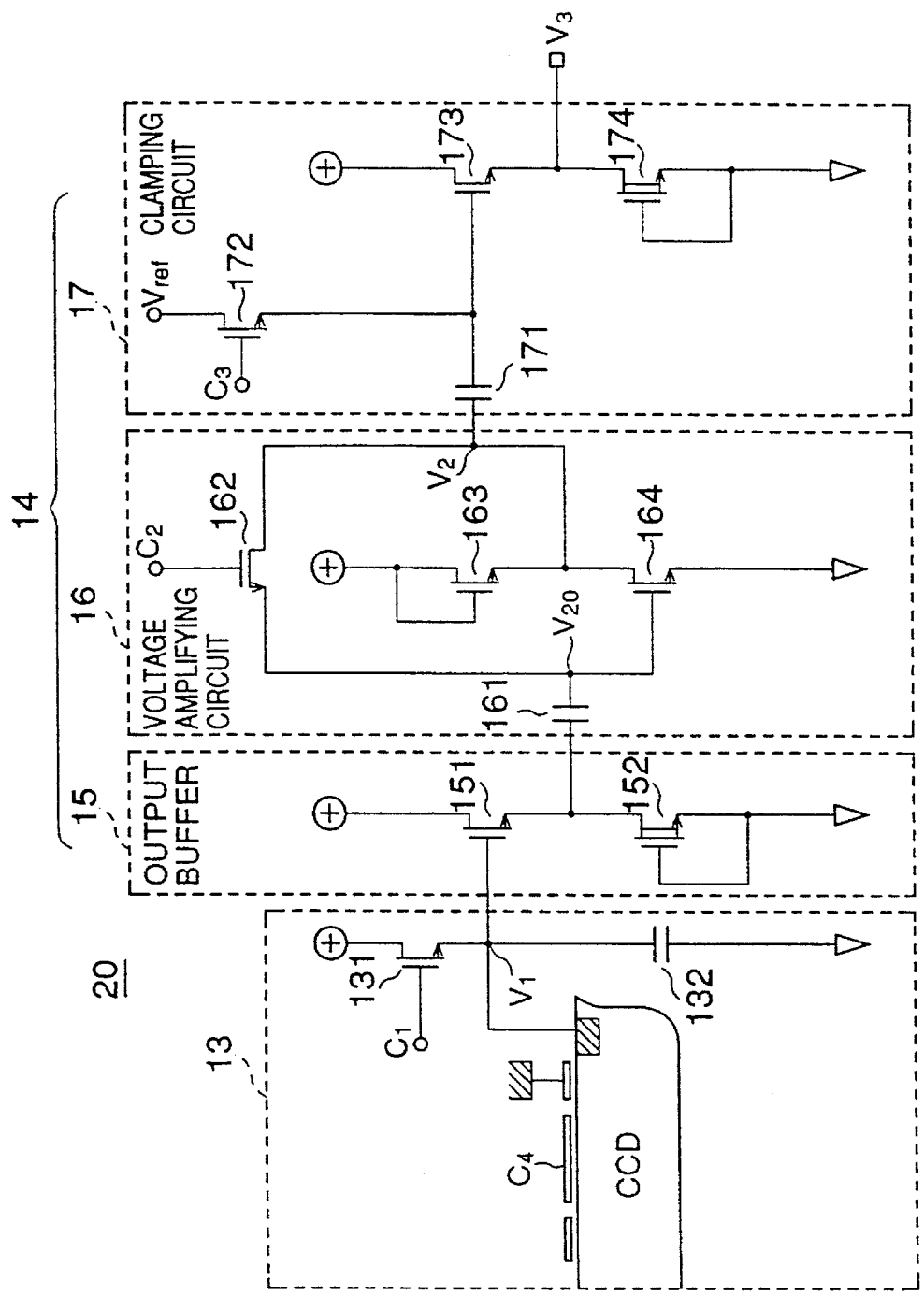
FIG. 4 is a circuit diagram showing an output circuit according to a second embodiment of the present invention as a detailed circuitry of the output circuit of the solid state imaging device according to the first embodiment.

In the solid state imaging device according to the first embodiment shown in FIG. 2, if the output circuit 14 is described in detail, there is an output circuit 20 according to a second embodiment shown in FIG. 4.

In FIG. 4, components attached by the same numerals in FIG. 2 are the same components in the solid state imaging device according to the first embodiment. The CCD register 13 comprises an N-channel metal oxide semiconductor (MOS) transistor 131, and a capacitor 132, in which a signal $V_1$ is detected from a junction point between a drain of the transistor 131 and the capacitor 132. Furthermore, a control potential $C_4$ is detected from an electrode of the CCD register 13, and a control potential $C_1$ is supplied to a gate of the MOS transistor 131.

The output buffer 15 comprises an N-channel MOS transistor 151 having a gate to which the signal $V_1$ is supplied, and an N-MOS transistor 152 as a constant current source which is connected in series with the transistor 151. A potential of a junction point between the transistors 151 and 152 is stored in a capacitor 161 in the voltage amplifier circuit 16.

Figure 6:
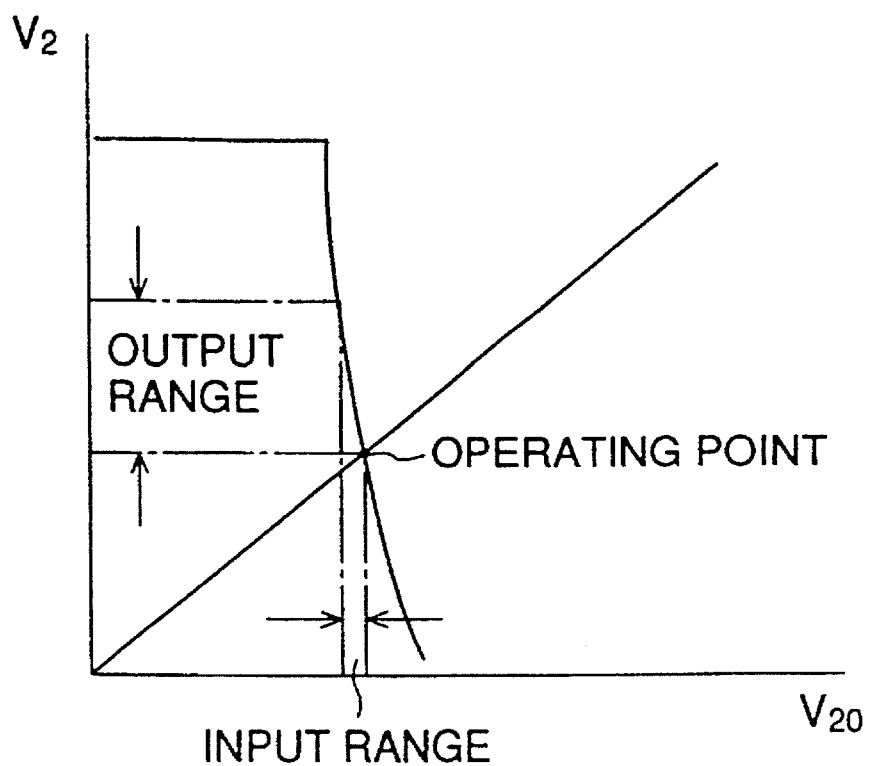
FIG. 6 is a graph showing an input/output relationship for explaining an operating point of an output buffer in the output circuit shown in FIG. 4.

The voltage amplifier circuit 16 comprises the capacitor 161, and N-MOS transistors 162–164, and has a characteristic in which an output operating point of the voltage amplifier circuit 16 is determined by a junction voltage between a drain-gate of the transistors 162 and 164 and the capacitor 161 and a junction potential $V_2$ between a source of the transistor 162 and a junction point of the transistors 163 and 164, as shown in FIG. 6. The control potential $C_2$ is supplied to a gate of the transistor 162.

The clamping circuit 17 comprises a capacitor 171 and transistors 172–174, in which the capacitor 171 stores a junction potential $V_2$ of the voltage amplifier circuit 16. A control potential $C_3$ is supplied to a gate of the transistor 172, and a source of the transistor 172 is connected to a reference potential $V_{ref}$. A potential of a junction point between the capacitor 171 and a drain of the transistor 172 is supplied to a gate of the transistor 173, and a potential $V_3$ of a junction point between a drain of the transistor 173 and a source of the transistor 174 as a constant current source is supplied to a control circuit 18 as the signal $V_{AGC}$.

Figure 5:
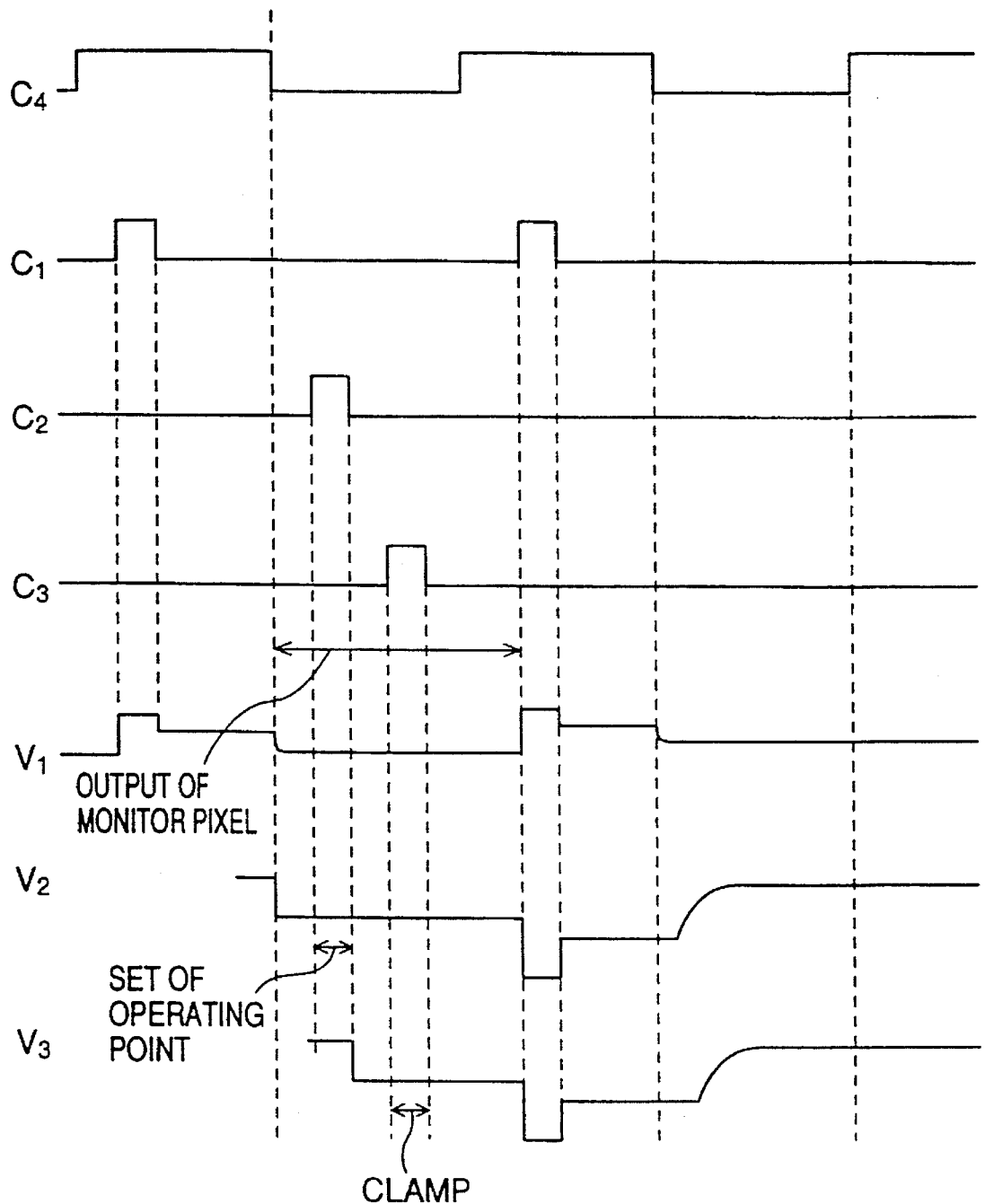
FIG. 5 is a graph showing a change of the output signals of the output circuit shown in FIG. 4.

A potential of each portion in FIG. 4 can be shown in a timing chart of FIG. 5, in which an output potential $V_1$, $V_2$ and $V_3$ of the output buffer 15, voltage amplifying circuit 16 and clamping circuit 17 respectively have a wave form shown in FIG. 5. Control potentials $C_1$–$C_4$ respective have timings shown in FIG. 5. In this, manner, the mean value is clamped.

Figure 7:
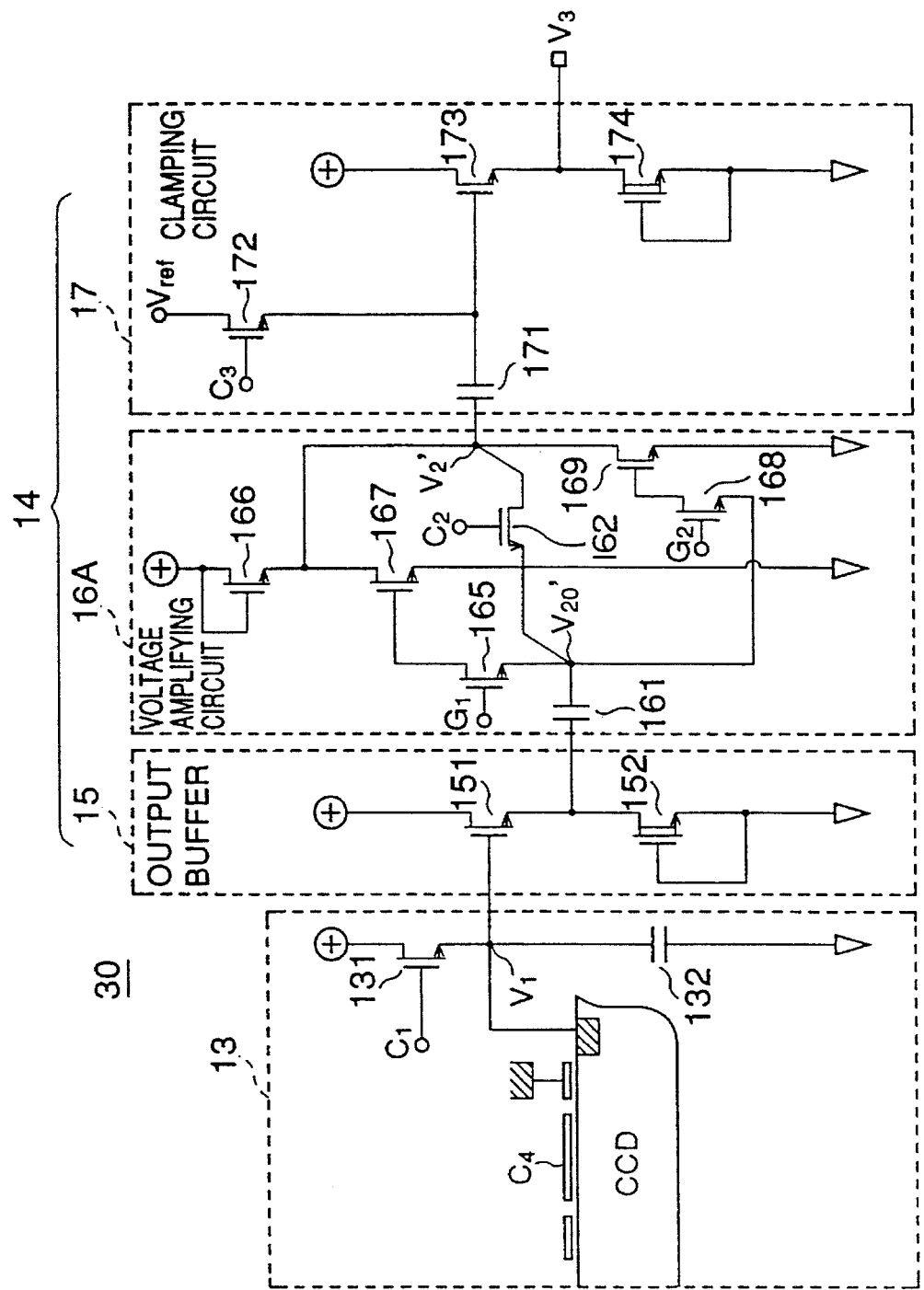
FIG. 7 is a circuit diagram showing an output circuit according to a third embodiment of the present invention including a different and detailed constitution.
Figure 8:
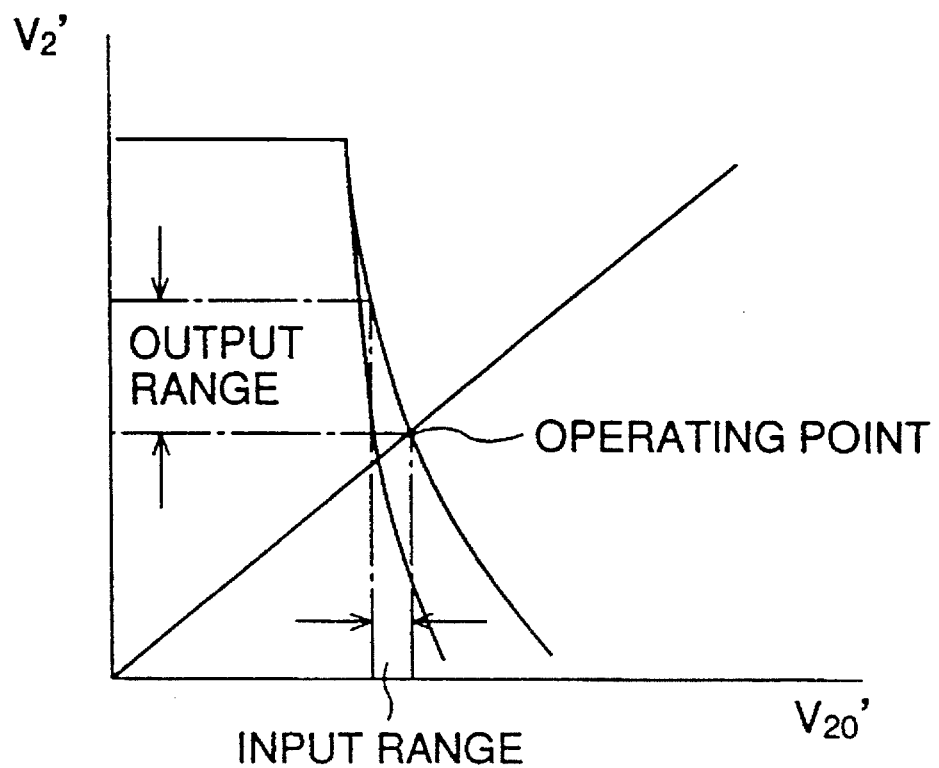
FIG. 8 is a graph showing an input/output relationship for explaining an operating point of an output buffer in the output circuit shown in FIG. 7.

Next, using FIGS. 7 and 8, there is described a solid state imaging device according to a third embodiment of the present invention. FIG. 7 shows an output circuit 30 as a modified example of the output circuit 20 shown in FIG. 4. The output circuit 30 includes a voltage amplifying circuit 16A comprising transistors 165 and 169 both gates of which. gains $G_1$ and $G_2$ are supplied in the manner that signal levels "H" and "L" are alternatively changed over, in the place of the voltage amplifying circuit 16 as shown in FIG. 4.

An output operating point of the voltage amplifying circuit 16A is shown in FIG. 8, and also a relationship between an output potential $V'_2$ and input potential $V'_{20}$ of the voltage amplifying circuit 16A is shown in FIG. 8.

Figure 9:
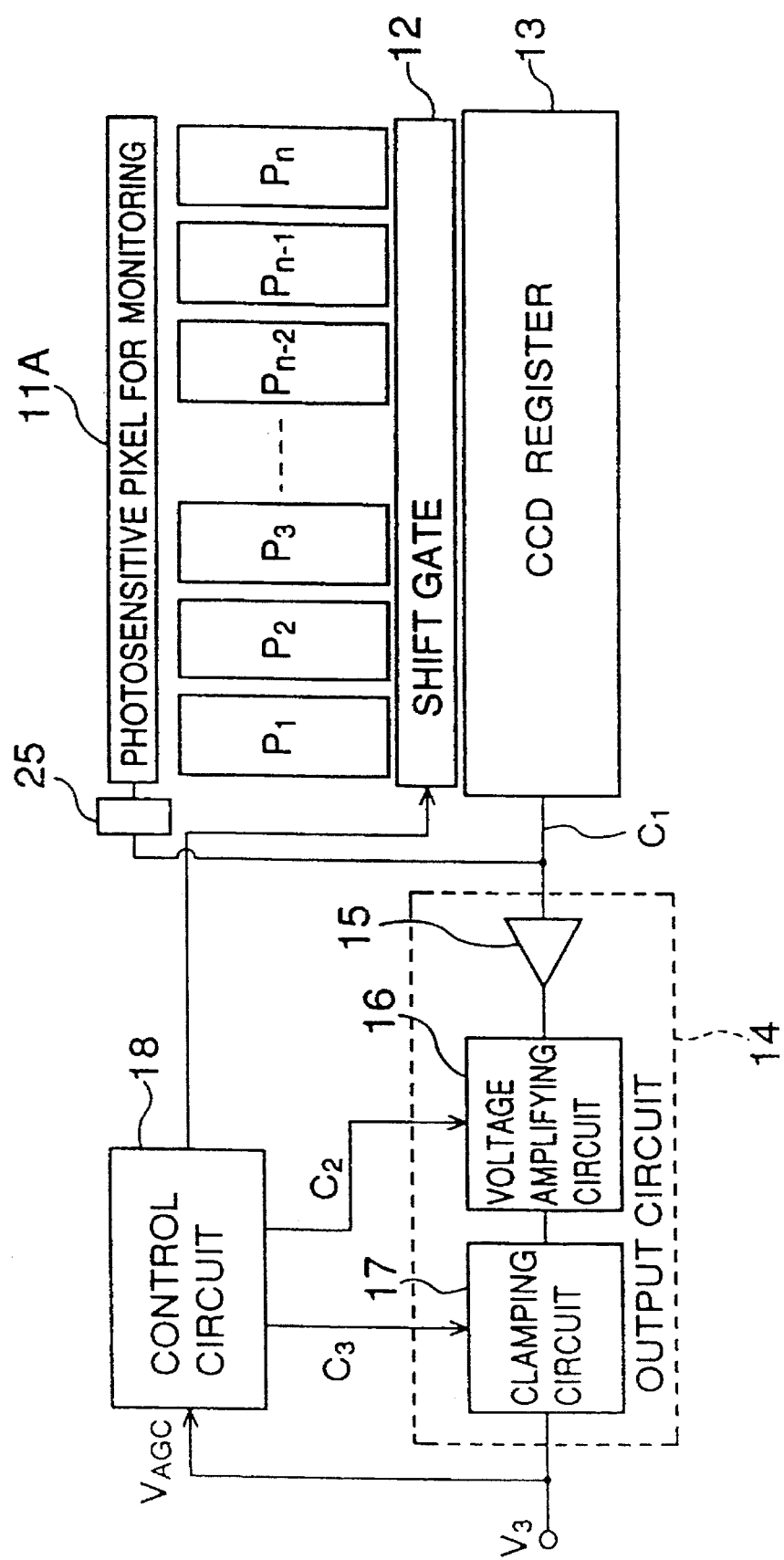
FIG. 9 is a block diagram showing a solid state imaging device according to a fourth embodiment of the present invention.

FIG. 9 shows a solid state imaging device according to a fourth embodiment of the present invention. The solid state imaging device according to the fourth embodiment supplies an output of the monitor photosensitive pixel 11A through a switch 25 to the output buffer 15, and measures a mean value of signal charges of each picture photosensirive pixel by detecting the output of the pixel 11A. Since other constitutions are the same as their previous embodiments, duplicated description will be omitted.

Figure 10:
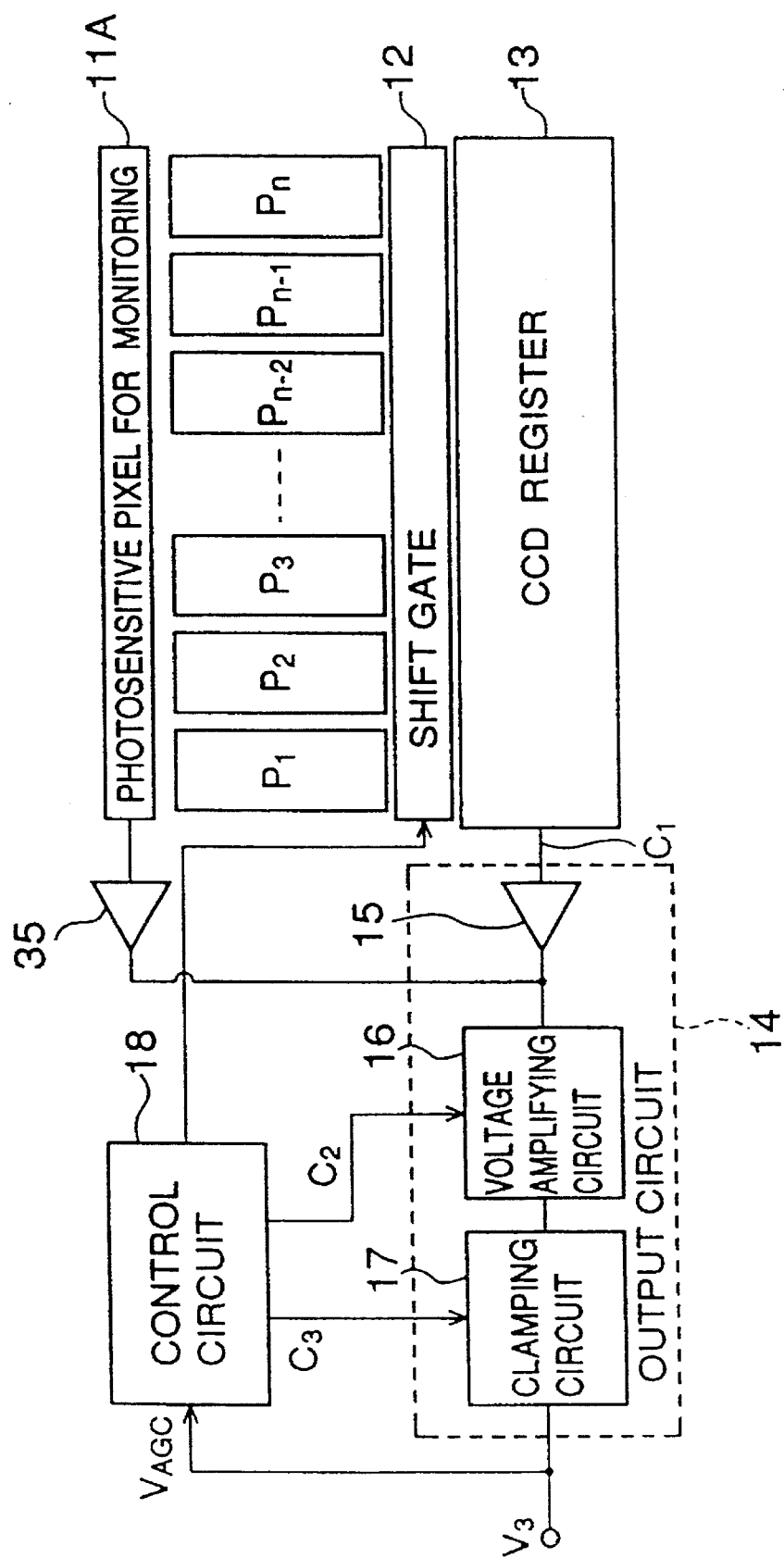
FIG. 10 is a block diagram showing a solid state imaging device according to a fifth embodiment of the present invention.

FIG. 10 shows a solid state imaging device according to a fifth embodiment of the present invention. In the solid state imaging device according to the fifth embodiment, an output buffer 35 for the monitor photosensitive pixel 11A is provided in parallel with the output buffer 15 for the picture photosensitive pixels $P_1$–$P_n$. Since other constitutions are the same as the previous embodiments, duplicated description will be omitted.

Figure 11:
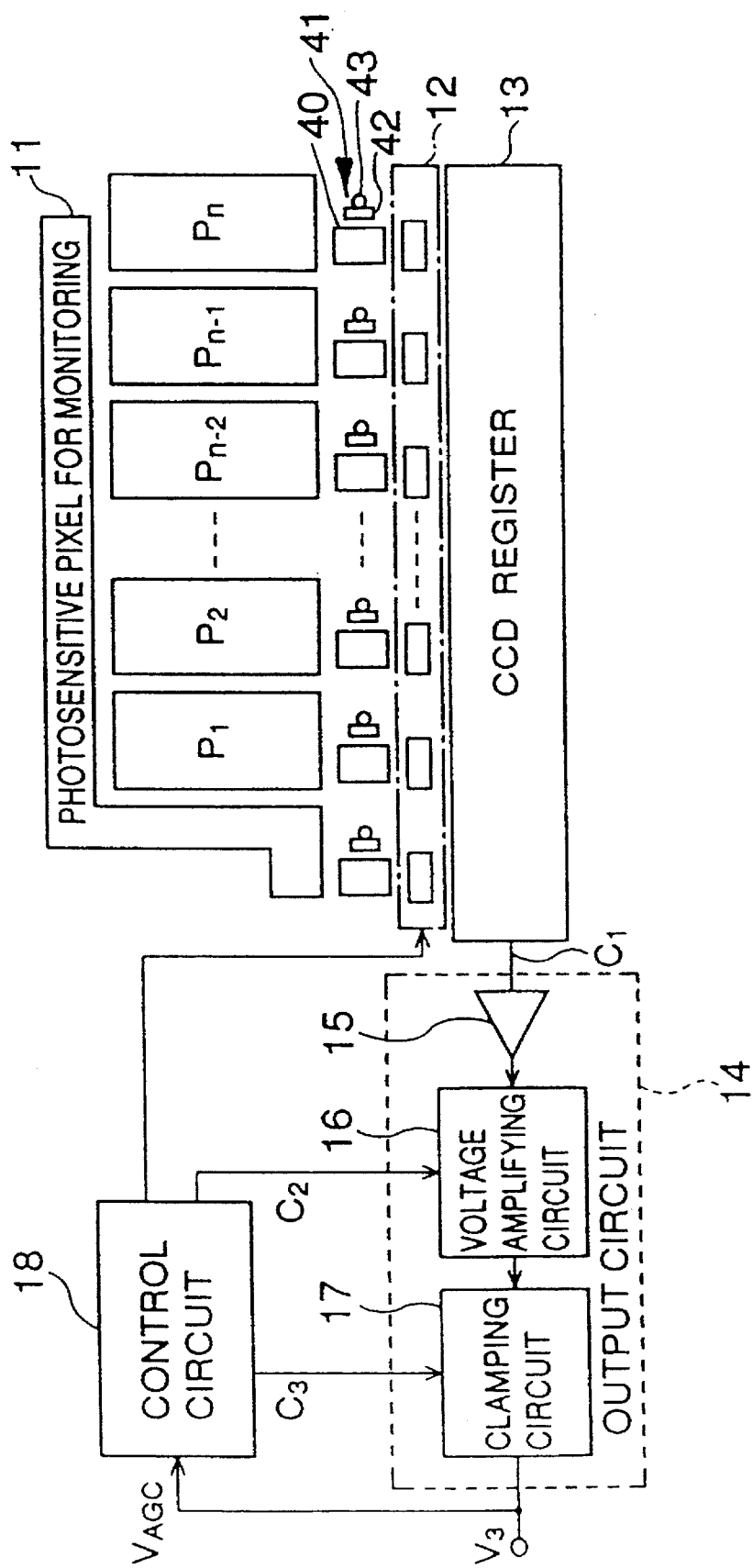
FIG. 11 is a block diagram showing a solid state imaging device according to a sixth embodiment of the present invention.

FIG. 11 shows a solid state imaging device according to a sixth embodiment, and is a modified example of the first embodiment shown in FIG. 2. In FIG. 11, a plurality of storage portions 40 and a plurality of charge drain portions 41 are provided between the picture photosensitive pixels $P_1$–$P_n$ and shift gates 12. Each of the charge drain portions 41 comprises a gate 42 and a drain portion 43. By the constitution, even though an idling current occurs the same manner of other pixels in the monitor photosensitive pixel, the idling current is compensated by the storage portions 40 and the charge drain portions 41.

Figure 12:
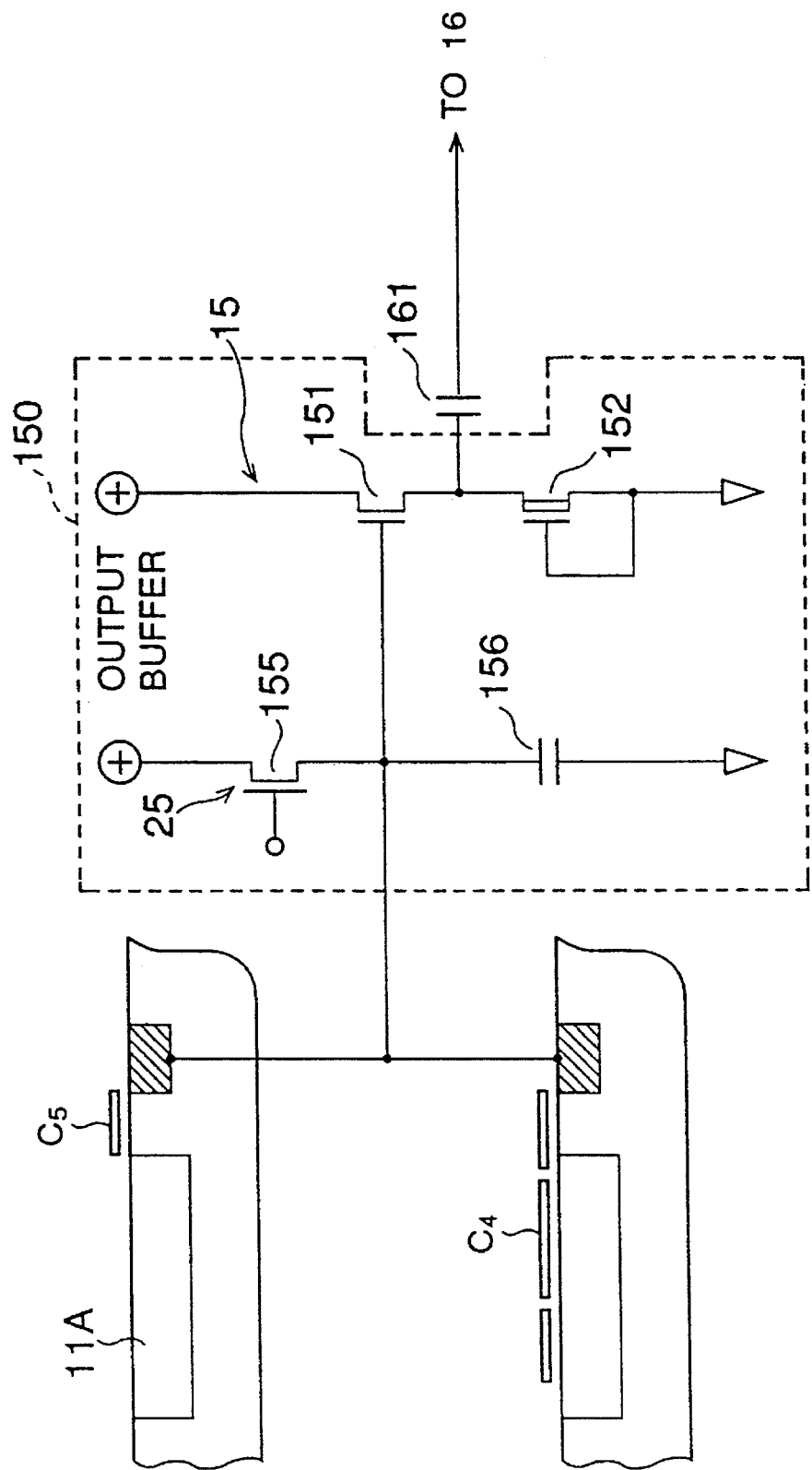
FIG. 12 is a circuit diagram showing a solid state imaging device according to a seventh embodiment of the present invention.

FIG. 12 shows a solid state imaging device according to a seventh embodiment of the present invention, which shows, a detailed circuitry of an output buffer 15 and a switch 25 in the solid state imaging device according to the fourth embodiment shown in FIG. 9. In FIG. 12, an output buffer 150 according to the seventh embodiment comprises a change over switch 25 including a transistor 155 and a capacitor 156 in addition to the constitution the output buffer 15 (see FIG. 4) according to the second embodiment.

Figure 13:
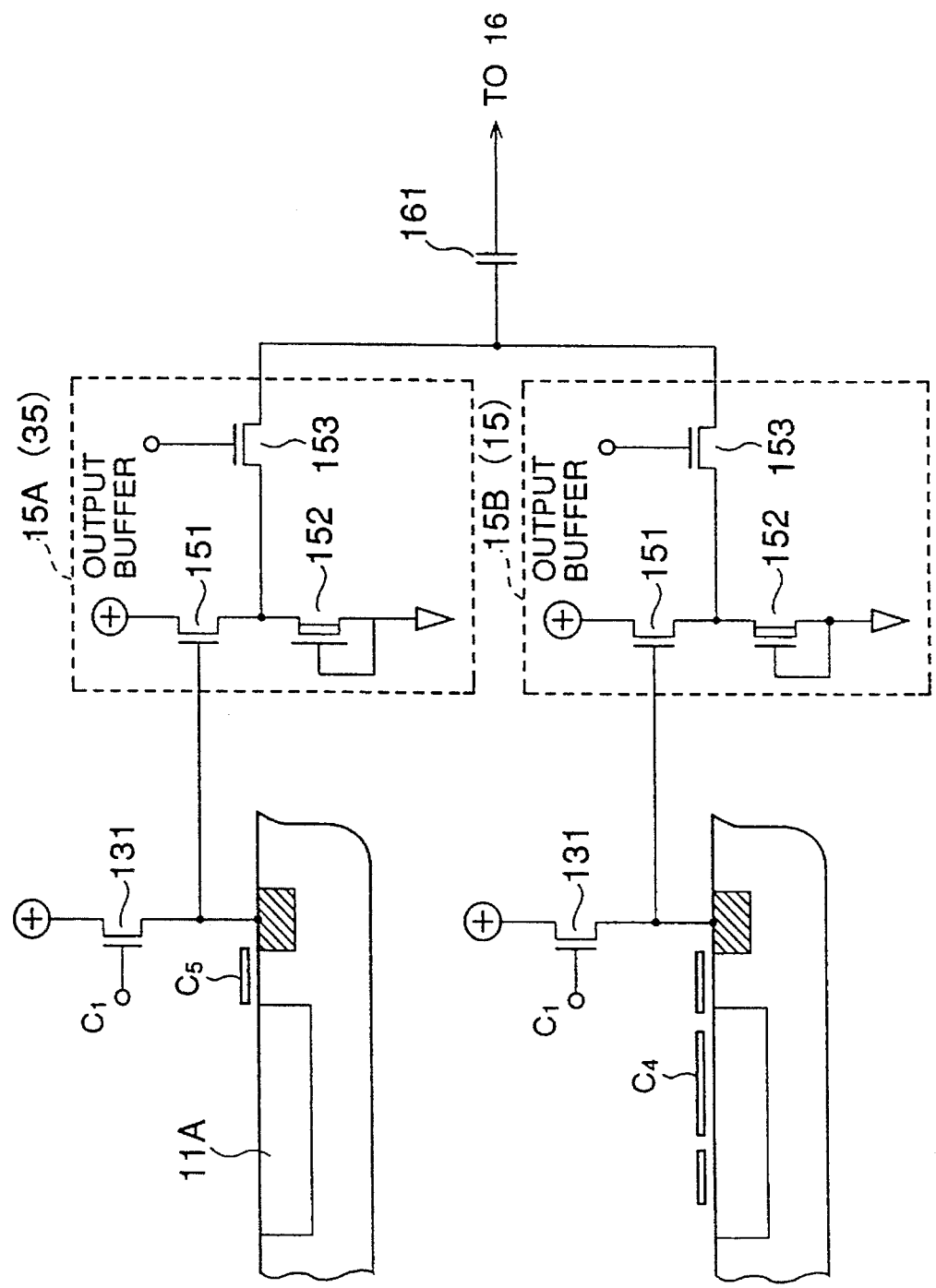
FIG. 13 is a circuit diagram showing a solid state imaging device according to an eighth embodiment of the present invention.

Next, FIG. 13 shows a solid state imaging device according to an eighth embodiment of the present invention. The solid state imaging device according to the eighth embodiment shows a detailed circuitry of the output buffer 35 for the monitor photosensitive pixel and the output buffer 15 for the picture photosensitive pixels in the solid state imaging device according to the fifth embodiment shown in FIG. 10. In FIG. 13, output buffers 15A and 15B respectively comprise a set of transistors 151–153, and each set has the same connection of the transistors 151–153.

FIGS. 14–17 show a various modifications with respect to an arrangement between the picture photosensitive pixels $P_1$–$P_n$ and the monitor photosensitive pixel 11.

Figure 14:
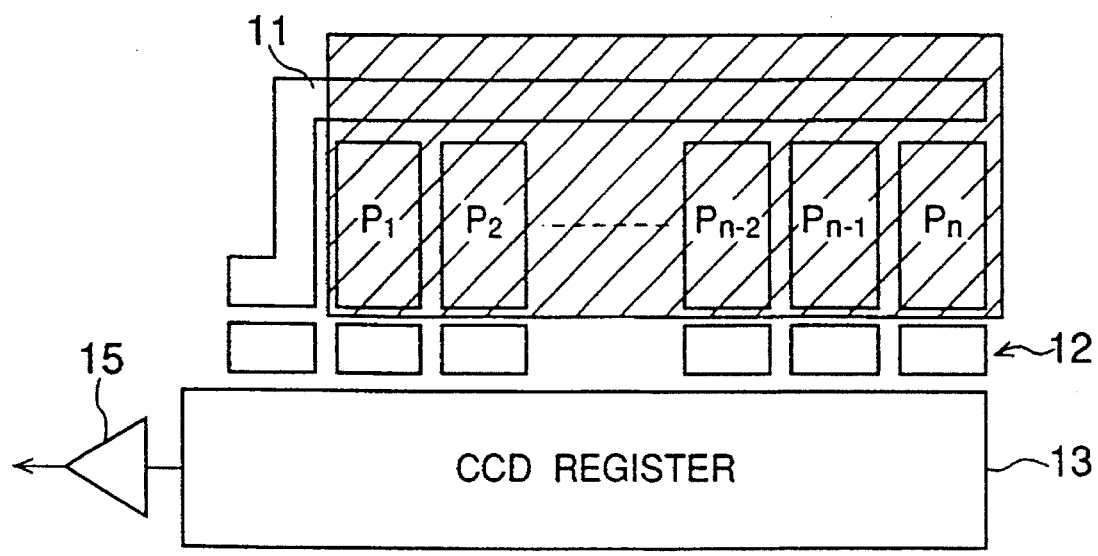
FIG. 14 is a block diagram showing a solid state imaging device according to a ninth embodiment of the present invention.

A solid state imaging device according to a ninth embodiment shown in FIG. 14 has the same constitution as the solid state imaging device according to the first embodiment. In FIG. 14, shift gates 12 are provided corresponding to the monitor photosensitive pixel 11 and the picture photosensitive pixels $P_1$–$P_n$, respectively. In the figure, a region shown by an oblique line is a photosensitive pixel region. In this example, it is possible to clamp at a head of one line output.

Figure 15:
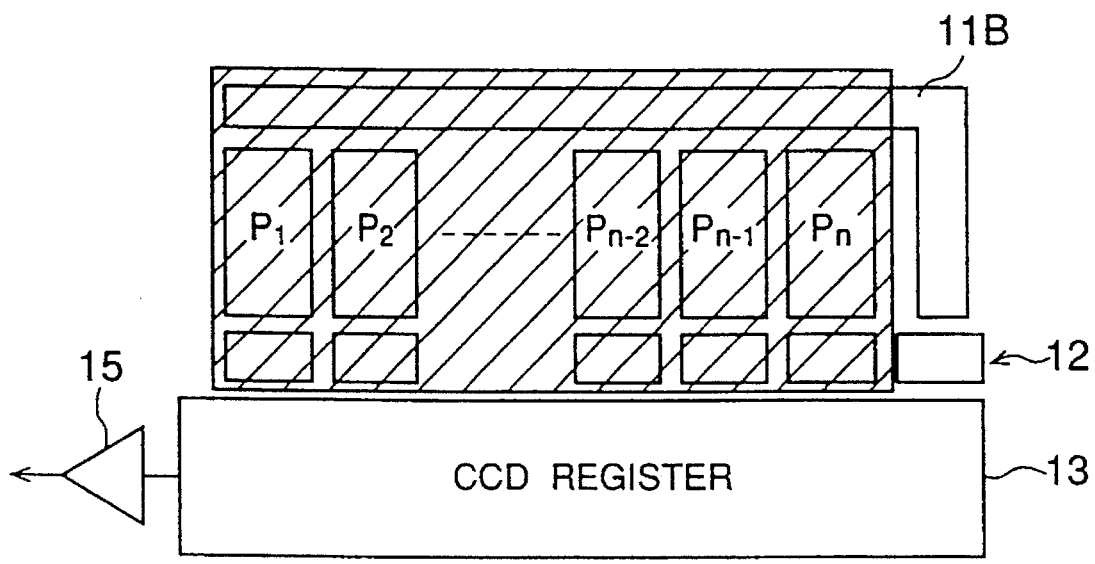
FIG. 15 is a block diagram showing a solid skate imaging device according to a tenth embodiment of the present invention.

A solid state imaging device according to a tenth embodiment shown in. FIG. 15 shows an example for clamping at the end of one line to the contrary with the solid state imaging according to the ninth embodiment. Accordingly, the monitor photosensitive pixel 11B is provided at a latter stage of the last picture photosensitive pixel $P_n$.

Figure 16:
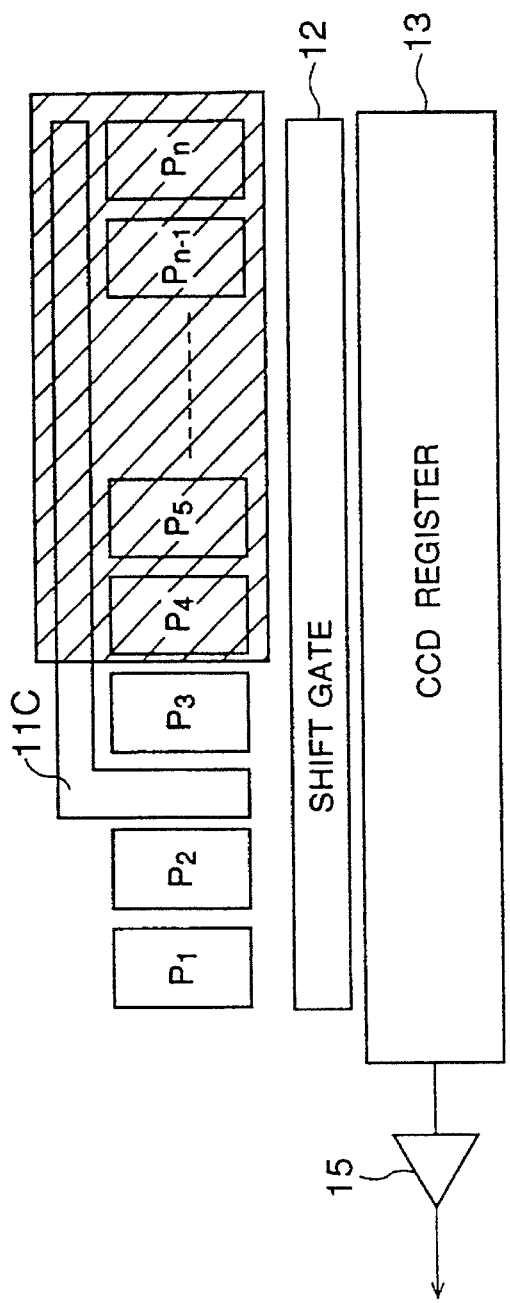
FIG. 16 is a block diagram showing a solid state imaging device according to eleventh embodiment of the present invention.

FIG. 16 shows a constitution of a solid state imaging device according to an eleventh embodiment. In the figure, a monitor photosensitive pixel 11C passes through second and third picture photosensitive pixels $P_2$ and $P_3$, and opposes to the shift gate 12. The solid state imaging device according to the eleventh embodiment is an example of changing over AGC/gain by an output of the monitor photosensitive pixel 11C.

Figure 17:
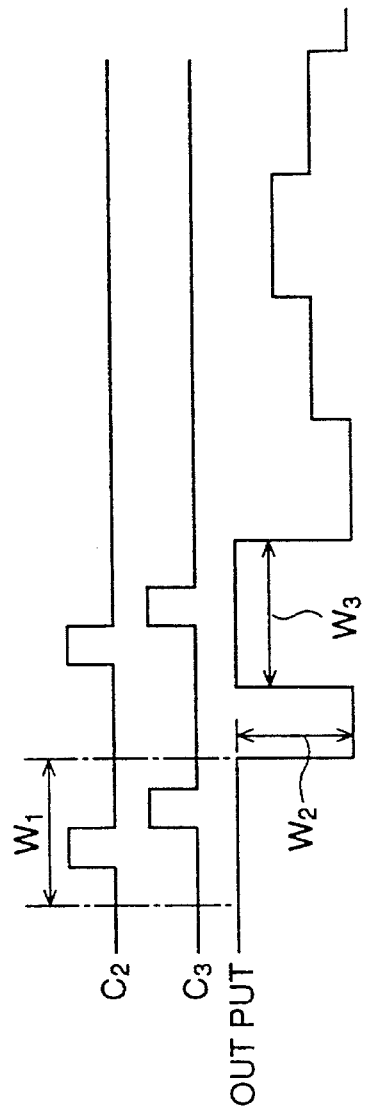
FIG. 17 is a graph showing a change with lapse of time in an output signal of an output circuit shown in FIG. 16.

In FIG. 17 for explaining operation of the eleventh embodiment, a clamp/operating point is set during a time interval $W_1$ by outputs of the shaded pixels $P_1$ and $P_2$. Then, an AGC/gain are changed over by an output $W_2$ of the monitor photosensitive pixel. The judgement of the gain and the set of clamp/operating point are simultaneously performed during the time interval $W_3$ by an output of the shaded pixel $P_3$.

I claim:

1. A solid state imaging device comprising:

a plurality of picture photosensitive pixels for generating first signal charges corresponding to an incident light amount;

signal charge transfer means for transferring in an order the first signal charges outputted from the picture photosensitive pixels;

a monitor photosensitive pixel for generating second signal charges in proportion to a mean value of the incident light amount of a predetermined number of picture photosensitive pixels;

common output means for converting both of the first and second signal charges into first and second output signals, the first signal charges generated in the picture photosensitive pixels being transferred to the common output means by the signal charge transfer means, and the second signal charges generated in the monitor photosensitive pixel being transferred to the common output means by the signal charge transfer means; and a common signal charge path, including a CCD register, and provided between said common output means and said picture photosensitive pixels and said monitor photosensitive pixel;

wherein said monitor photosensitive pixel has a predetermined area substantially the same as each of the plurality of picture photosensitive pixels to have the same sensitivity as each of the plurality of picture photosensitive pixels.

2. The solid state imaging device according to claim 1; wherein said device further comprises:

a clamp circuit provided in the common output means for clamping the first output signal which is generated by converting the first signal charges transferred from the signal charge transfer means; and a control circuit for setting an upper limit or low limit voltage of the clamp circuit on the basis of the second output signal which is generated by converting the second signal charges of the monitor photosensitive pixel by the common output means.

3. The solid state imaging device according to claim 1; wherein said device further comprises:

an amplifying circuit for amplifying the first output signal which is converted from the first signal charges transferred from the signal charge transfer means, and a control circuit for setting a gain of the amplifying circuit on the basis of the second output signal which is converted from the second signal charges outputted from the monitor photosensitive pixel.

* * * * *